United States Patent
Galburt

(10) Patent No.: US 9,740,596 B1
(45) Date of Patent: Aug. 22, 2017

(54) METHOD OF ACCELERATED TEST AUTOMATION THROUGH UNIFIED TEST WORKFLOWS

(71) Applicant: EMC Corporation, Hopkinton, MA (US)

(72) Inventor: Mikhail Galburt, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 451 days.

(21) Appl. No.: 14/133,466

(22) Filed: Dec. 18, 2013

(51) Int. Cl.
  *G06F 9/44* (2006.01)
  *G06F 11/36* (2006.01)
  *H04N 19/10* (2014.01)

(52) U.S. Cl.
  CPC ...... *G06F 11/3688* (2013.01); *G06F 11/3664* (2013.01); *G06F 11/3672* (2013.01); *H04N 19/10* (2014.11)

(58) Field of Classification Search
  CPC ............. G06F 11/3664; G06F 11/3672; G06F 11/3688; H04N 19/10
  See application file for complete search history.

(56) References Cited

U.S. PATENT DOCUMENTS

| | | | | |
|---|---|---|---|---|
| 5,774,725 A | * | 6/1998 | Yadav et al. | 717/135 |
| 6,031,990 A | * | 2/2000 | Sivakumar | G06F 11/3664 |
| | | | | 714/E11.208 |
| 6,067,639 A | * | 5/2000 | Rodrigues et al. | 714/38.11 |
| 6,243,862 B1 | * | 6/2001 | Lebow | 717/131 |
| 6,279,124 B1 | * | 8/2001 | Brouwer et al. | 714/38.11 |
| 6,397,378 B1 | * | 5/2002 | Grey et al. | 717/175 |
| 6,510,402 B1 | * | 1/2003 | Logan et al. | 702/186 |
| 6,732,296 B1 | * | 5/2004 | Cherny et al. | 714/32 |
| 7,065,677 B1 | * | 6/2006 | Hughes | 714/38.14 |
| 7,797,680 B2 | * | 9/2010 | Haas | G06F 11/3688 |
| | | | | 714/38.1 |
| 8,458,666 B2 | * | 6/2013 | Mitra | G06F 11/3688 |
| | | | | 717/125 |

(Continued)

OTHER PUBLICATIONS

Dirk Meister et al., "Multi-Level Comparison of Data Deduplication in a Backup Scenario", [Online], 2009, pp. 1-12, [Retrieved from Internet on May 15, 2017], <http://delivery.acm.org/10.1145/1540000/1534541/a8-meister.pdf>.*

(Continued)

*Primary Examiner* — Ziaul A Chowdhury
(74) *Attorney, Agent, or Firm* — Blakely, Sokoloff, Taylor & Zafman LLP

(57) ABSTRACT

Various embodiments are describe techniques, methods, and system disclosing accelerated test automation that is invoking a first script representing a first test case of an application under test, in response to a set of input data. From the first script, a plurality of generalized script elements are invoked, where each generalized script element tests a specific functionality of the application under test. A second script, representing a second test case is executed, and at least some of the plurality of generalized script elements that were invoked by the first script are invoked by the second script. Thereafter, it is determined whether the first and second test cases have passed or failed the software testing based on execution of the first and second scripts.

21 Claims, 11 Drawing Sheets

(56) References Cited

U.S. PATENT DOCUMENTS

| | | | | |
|---|---|---|---|---|
| 8,881,105 | B2* | 11/2014 | Quilter, Jr. | G06F 11/3672 714/38.1 |
| 8,949,208 | B1* | 2/2015 | Xu | G06F 3/0641 707/661 |
| 9,274,907 | B1* | 3/2016 | Bachu | G06F 11/1448 |
| 9,317,410 | B2* | 4/2016 | Eilam | G06F 11/3688 |
| 9,571,698 | B1* | 2/2017 | Wallace | H04N 19/10 |
| 2002/0133807 | A1* | 9/2002 | Sluiman | 717/124 |
| 2003/0126521 | A1* | 7/2003 | Radestock | 714/100 |
| 2005/0071447 | A1* | 3/2005 | Masek et al. | 709/223 |
| 2005/0132333 | A1* | 6/2005 | Neumann et al. | 717/124 |
| 2005/0188262 | A1* | 8/2005 | Rosenman et al. | 714/25 |
| 2005/0251716 | A1* | 11/2005 | Degrenand | G06F 11/2221 714/736 |
| 2007/0006046 | A1* | 1/2007 | Overman | G06F 11/3414 714/38.1 |
| 2007/0028216 | A1* | 2/2007 | Boss et al. | 717/124 |
| 2007/0043956 | A1* | 2/2007 | El Far et al. | 713/189 |
| 2011/0047428 | A1* | 2/2011 | Kikta | G06F 11/263 714/733 |
| 2012/0030516 | A1* | 2/2012 | De Keukelaere | G06F 11/3684 714/38.1 |
| 2012/0144248 | A1* | 6/2012 | Bull | G06F 11/3664 714/48 |
| 2013/0061204 | A1* | 3/2013 | Makey et al. | 717/104 |
| 2014/0129173 | A1* | 5/2014 | Kit | G06F 11/263 702/123 |
| 2015/0100829 | A1* | 4/2015 | Nanjundappa et al. | 714/38.1 |
| 2015/0100830 | A1* | 4/2015 | Nanjundappa et al. | 714/38.1 |
| 2015/0100831 | A1* | 4/2015 | Nanjundappa et al. | 714/38.1 |
| 2015/0100832 | A1* | 4/2015 | Nanjundappa et al. | 714/38.14 |
| 2015/0317216 | A1* | 11/2015 | Hsu | G06F 3/0655 707/679 |

OTHER PUBLICATIONS

Zhonghua Sheng et al., "A Privacy-Protecting File System on Public Cloud Storage", [Online], 2011, pp. 141-149, [Retrieved from Internet on May 15, 2017], <http://www.ericzma.com/homepage/publication/sheng11bifs.pdf>.*

Hongyi Wang et al., "Distributed Systems Meet Economics: Pricing in the Cloud", [Online], 2010, pp. 1-7, [Retrieved from Internet on May 15, 2017], <https://www.usenix.org/legacy/event/hotcloud10/tech/full_papers/WangH.pdf>.*

Waide Tristram et al., "Performance optimisation of sequential programs on multi-core processors", [Online], 2010, pp. 119-128, [Retrieved frim Internet on May 15, 2017], <http://delivery.acm.org/10.1145/2390000/2389851/p119-tristram.pdf>.*

* cited by examiner

702

Test Suite #1

[Initial step up] /* Code to read and load a configuration file that provides environment variable for the application under test */

[Equivalent script to traditional exemplary test case #1]
Regular Expression TS1 = GSTestABC(GSTestA());

[Equivalent script to traditional exemplary test case #2]
Boolean TS2 = GSTestAXY ();

FIG. 7

METHOD OF ACCELERATED TEST AUTOMATION THROUGH UNIFIED TEST WORKFLOWS

FIELD OF THE INVENTION

Embodiments of the present invention relates generally to developing test cases used to test an application or software. More particularly, embodiments of the invention relates to generating accelerated test automation through the use of unified workflows.

BACKGROUND

In software engineering, testing is an integral part of the development cycle of an application or software. For this, testing an application or software involves generating test cases where each test case tests a certain functionality of the application or software. Often this involves invoking other aspects of the application or software. Code or scripts are written to develop each test case based on a specific test case logic/scenario. Further, scripts can be written to automate the testing process. However, writing individual testing logic for each test case often becomes a laborious and time consuming process. Furthermore, maintenance of automated test cases or test suites designed with traditional methods are also time consuming as any changes in functionality of Application Under Test (AUT) requires update/modification of multiple test case scripts.

FIG. 1 is a block diagram illustrating automated testing of an AUT using known traditional methods. Framework 102 includes framework engine 104 interacting with the framework library 106. Framework library 106 includes functions or procedures provided within a framework function library 108 where all the functions needed to test an AUT are provided. Test repository 110 includes one or more test suites 112. Each test suite 112 includes scripts/code logic for one or more test cases 114, each test case 114 testing a functionality or aspect of the AUT. In traditional methods, function library 106 is directly used (called) from test case 114 script of a test suite 112.

Framework 102 represents a general test automation framework including three main components, framework engine 104, framework library 106 (representing a collection of framework function library 108) and a test repository 110. The framework engine 104 represents the main script that configures environment for execution, runs the test suites 112 which represents a sequence of test cases 114, and is responsible for the output results or reports of test execution. The framework library 106 includes framework function library 108 which represents a collection of scripts that cover general functions or procedures required by the test cases/scenarios (e.g. data transformation, search processing, common command execution with parameters, etc.). With traditional test automation methods these functional scripts are utilized within test case's scripts to partially eliminate redundancy of the code.

The test repository 110 represents a collection of automated test cases usually grouped by test suites 112 to assist in maintenance. A test suite 112 represents a container for test cases 114 that are used for testing specific functionality, or a specific aspect of the AUT. Usually, grouping test cases 114 in test suite 112 helps in maintenance and planning for test coverage. However, such maintenance and planning can be limited in large scale application development if a functionality or aspect of the AUT changes during development.

FIG. 2 is a block diagram illustrating the problem associated with traditional methods. Traditional test suite 200 shows test suite 200 including two test cases, test case 1 202 and test case 2 204. In the test suite 200, test case 1 202 and test case 2 204 are grouped together in one suite because both test at least the same aspects of the AUT (in this case feature A of the AUT as disclosed below). Test case 1 202 and test case 2 204 of test suite 200 tests hypothetical features A, B, C, X, and Y of an AUT. It should be noted variables are used instead of actual testing features as the underlying problem associated with the traditional testing methods can be readily noticed without providing exact detail of the described features. In this hypothetical we presume features A, B, C, X, or Y each represents any feature or aspect of the AUT. It is presumed a successful testing of a given feature would return a logical value of 'true' or a value representing a logical value of 'true', and a failure of a given feature would return a logical value of 'false' or a value representing a logical value of 'false'. Test suite 200 represents a test suite in test repository 110. All test case(s) 114 in test repository 110 are written using framework library 106 and use framework engine 104 to process the AUT.

As an example, in FIG. 2, multiple test cases 114 of one test suite 112 are represented as test case 1 202 and test case 2 204 as represented by test suite 200. In this example, test case 1 202 tests the functionality of hypothetical features A, B, and C. Under traditional methods, test case 1 202 includes logic/code to shutdown and restart a service represented by the AUT to ensure memory has been cleared. Test case 1 202 further includes logic/code to test the functionality of hypothetical feature A of the AUT. Further, test case 1 202 includes logic/code to test the functionality of hypothetical feature B of the AUT, where feature B of the AUT is dependent on success of feature A. As explained above, a success of a feature means that a logical value of 'true' or a value representing a logical value of 'true' is a requirement to test dependent feature B of the AUT. Furthermore, test case 1 202 includes logic/code to test the functionality of feature C of the AUT where feature C is also dependent on the success of feature A.

As illustrated in FIG. 2, test suite 200 also includes test case 2 204 which tests hypothetical features A, X, and Y of the AUT. Similar to test case 1 202 test case 2 204 includes logic/code to shutdown and restart the service represented by the AUT to ensure memory has been cleared. Furthermore, similar to test case 1 202, test case 2 204 includes logic/code to test the functionality of feature A of the AUT. Further test case 2 204 has logic/code to test the functionality of feature X, where feature X is dependent on the success of feature A. Similarly, test case 204 has code to test the functionality of feature Y of the AUT, where feature Y is dependent on the success of feature X.

As can be seen both test cases, test case 1 202 and test case 2 204, have common code/logic to shutdown and restart a service represented by the AUT as well as testing the functionality of feature A. Under traditional testing methods, all code/logic described above would need to be written separately for both test case 1 202, and test case 2 204, including the common code/logic required for each test case. Thus, any change in the shutdown/restart code or in functionality A, during development, would require changing the code/logic in both test cases separately. Such a scenario can be problematic in large scale application development where features are often modified during the development phase of a project. Thus, using traditional testing methods, maintenance of automated test cases can be problematic and time consuming as maintenance of traditional automated test suites would require changes in functionality of the AUT that results in update/modification of multiple test cases scripts.

This problem can be exponentially increased in multi-tiered, large scale application development. Thus, what is needed is an efficient and scalable method of accelerated test automation of the application or software.

BRIEF DESCRIPTION OF THE DRAWINGS

Embodiments of the invention are illustrated by way of example and not limitation in the Figures of the accompanying drawings in which like references indicate similar elements.

FIG. 7 is a block diagram illustrating a test suite in pseudo-code using the test workflows in FIGS. 5 and 6.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the present invention described herein include methods, systems, and techniques to an accelerated test automation approach by substituting scripts/code for each test case with development and scripting of specific test workflow or generalized script unified for multiple test cases represented in a test suite.

Figure 1:
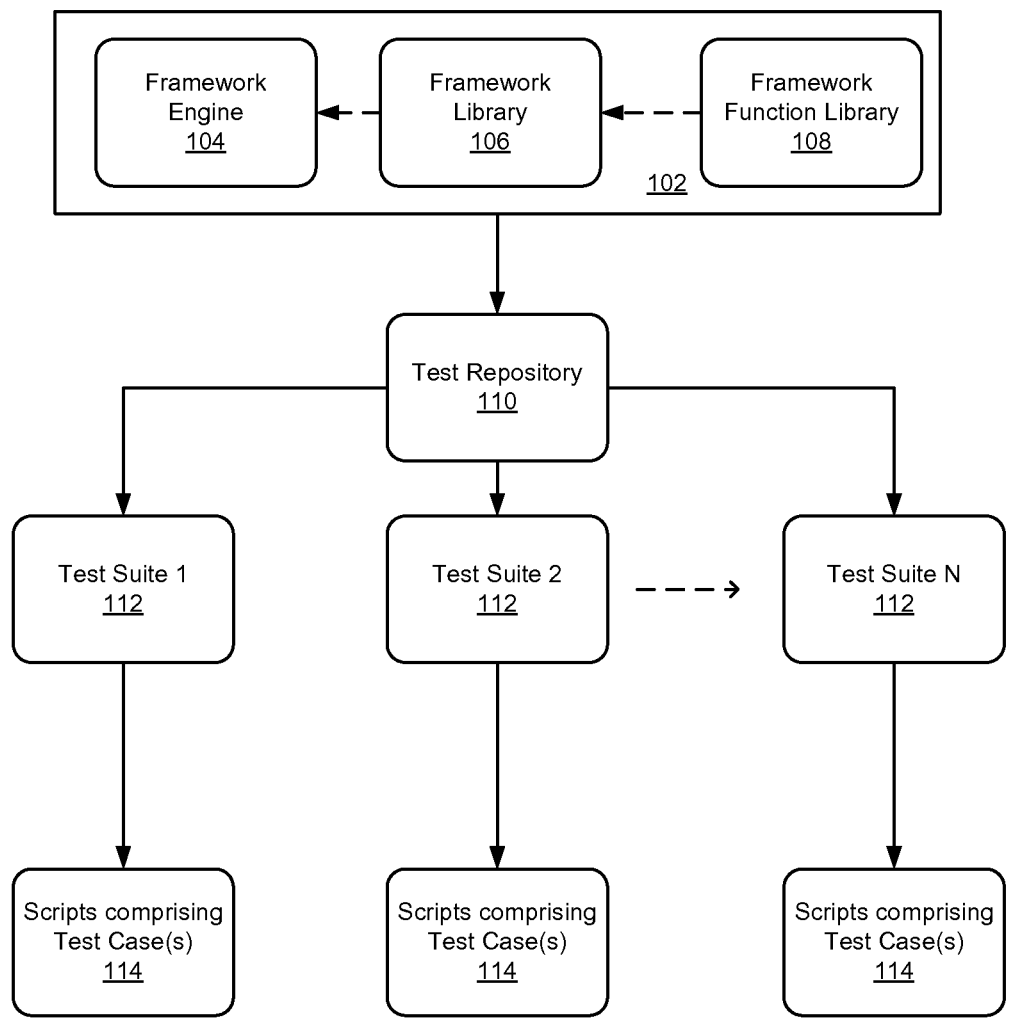
FIG. 1 is a block diagram illustrating the traditional approach of testing an application or software.
Figure 2:
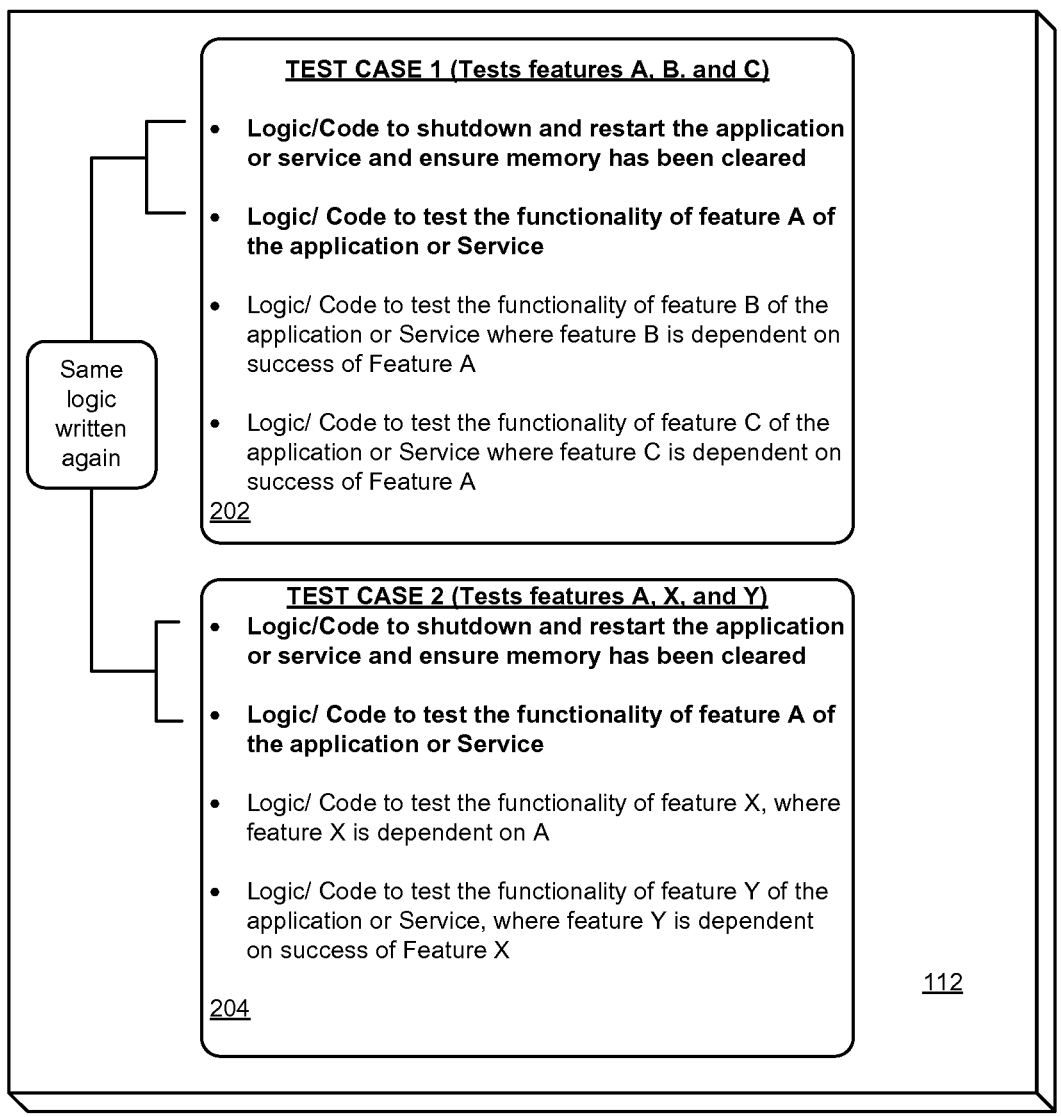
FIG. 2 is a block diagram illustrating the problems associated with traditional testing methods.
Figure 3:
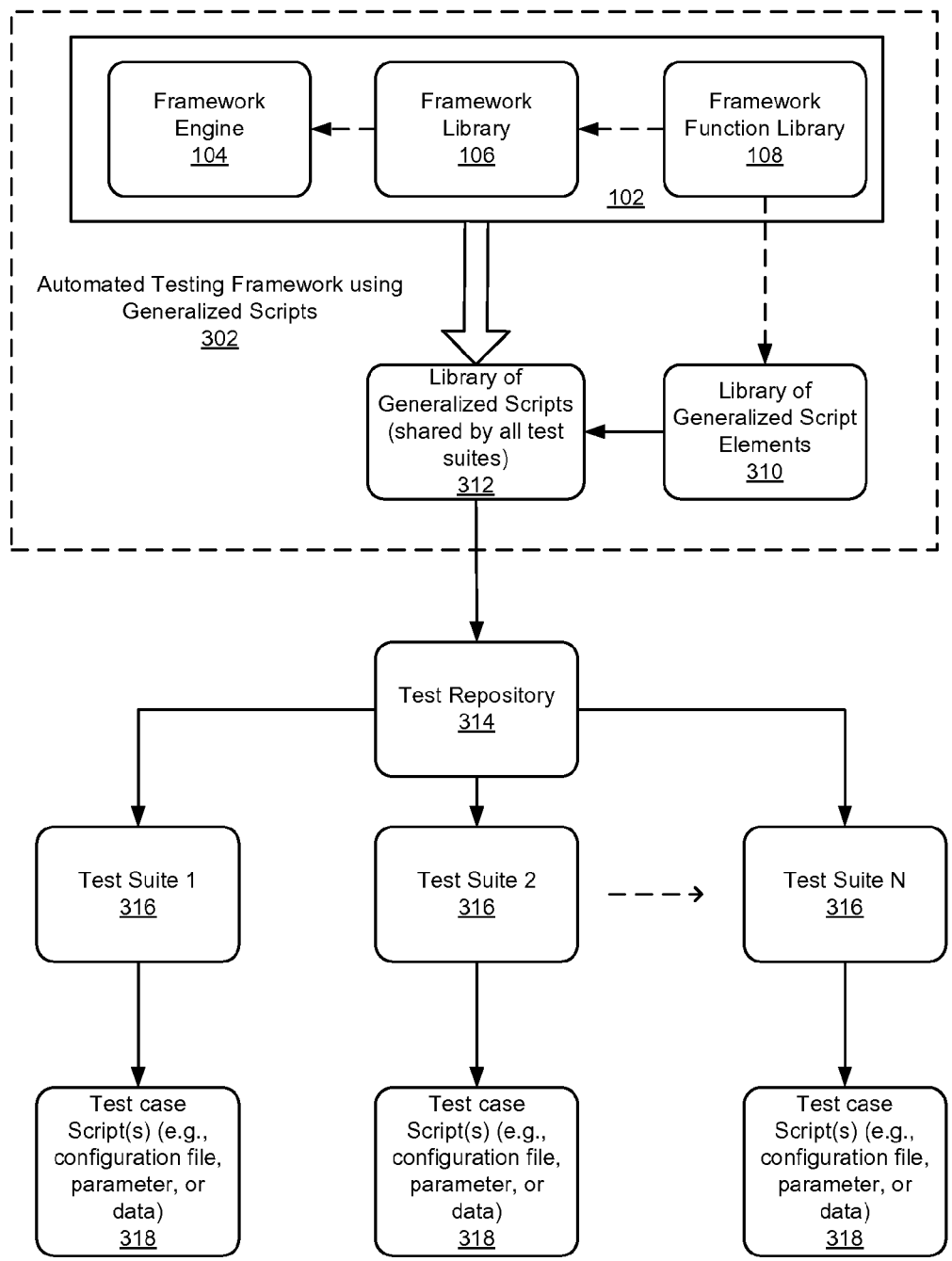
FIG. 3 is a block diagram illustrating the testing of an application or software by developing unified test workflows according to one embodiment of the invention.

FIG. 3 is a block diagram illustrating the testing of an application or software by developing unified test workflows/generalized scripts according to one embodiment of the invention. According to an embodiment of the present invention, the traditional framework library 106 of the test automation framework 102 can be transformed into multi-layered subordinated libraries as represented by block 302. In one embodiment, such multi-layered subordinate libraries include framework function library 108, a general library of generalized script elements 310 (also referred to as test workflow elements) and a library of generalized scripts/test workflows 312. Thus, in one embodiment, the library of generalized scripts/test workflows 312 are developed using the library of generalized script elements (workflow elements) 310 which utilize the framework library 306 and framework function library 308. In one embodiment, the library of generalized scripts 312 can be shared by multiple test suites 316 of test repository 314. In another embodiment all test suites 316 share the library of generalized scripts 312. In one embodiment, test repository 314 includes multiple test suites 312, each test suite representing a group of test cases 318 representing at least some common grouping functionality. According to an embodiment of the present invention, a test case 318 can comprise, at least in part, scripts written using the library of generalized scripts 312 which can be invoked using a set of input parameters or values. In one embodiment a test case 318 comprises a configuration file, a parameter, and/or data file as input to invoke at least one generalized script. In one embodiment, test case 318 comprises scripts developed using the library of generalized script elements (test workflow elements) 310. Further, in one embodiment, test case 318 can directly invoke the functions or procedures included in the library of generalized script elements 310.

According to an embodiment of the present invention, framework 102 can be extended into an automation testing framework using generalized scripts 302. In this embodiment, the framework function library 108 continues to provide coverage of general procedures and functions. These functions are used within scripts that are in library of generalized scripts elements 310. The scripts in the library of generalized scripts elements 310 are generalized to perform specific business tasks needed for testing specific AUT (or an aspect of the AUT). These scripts represent test workflow elements or generalized script elements, a collection of which is represented by the library of generalized script elements 310. These scripts are the principal building blocks for generalized scripts in the library of generalized scripts 312.

In one embodiment, the library of generalized scripts 312 represents a collection of generalized scripts that cover different scenarios required for testing specific AUT (or specific aspect of the AUT). In one embodiment these scripts utilize generalized scripts elements to produce specific scenario as represented by a test case 318. In another embodiment, the generalized script elements (represented as a collection in the library of generalized script elements 310) accept, as input, the data streams from automated test cases. Yet further, in another embodiment the generalized script or test workflow (represented as a collection of library of generalized script 312) can also accept, as input, the data streams from automated test cases. In one embodiment, a generalized script or test workflow can comprise at least another generalized script, where the other generalized script can comprise generalized script elements. According to another embodiment of the present invention, the generalized scripts or test workflow can accept different types of data streams from automated test case. This includes, but is not limited to, a set of parameters, a data file, a configuration file, and/or a file with commands to be run, etc. In one embodiment, a test case 318 becomes an entity that includes specific data structures for specific generalized script(s).

Any of the embodiments described updates to a function or feature of the AUT can be maintained by updating/modifying the library of generalized scripts 312 or the library of generalized script elements 310. Thus, updating/maintaining the code/logic at one place would automatically update/maintain all the test cases throughout all the test suits which utilize that particular generalized script or generalized script element being updated.

Figure 4:
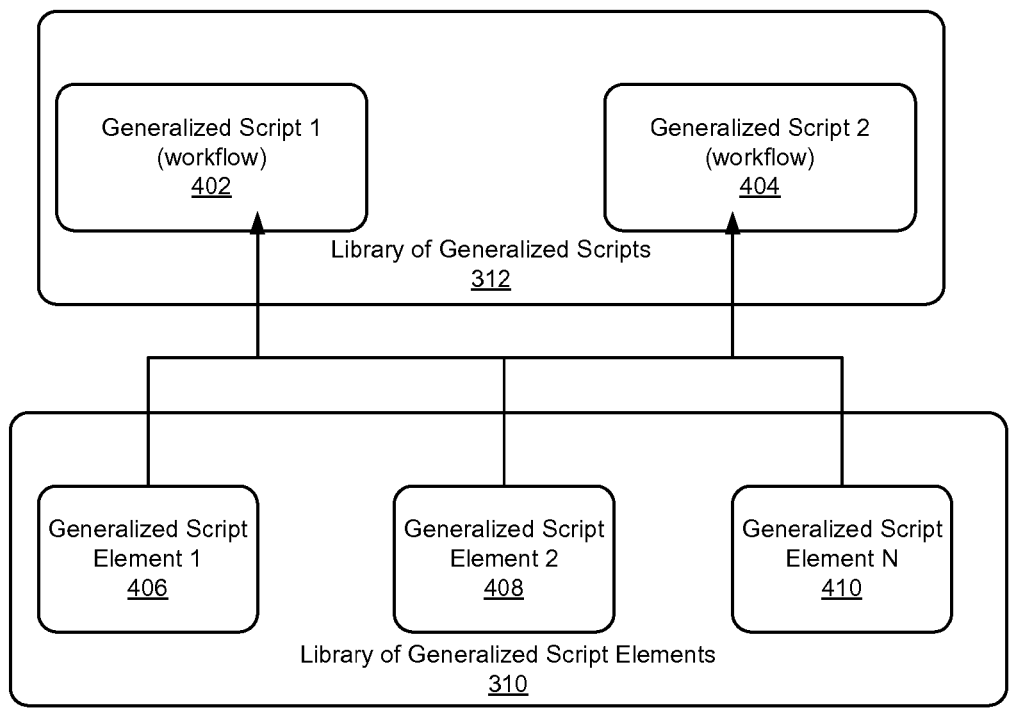
FIG. 4 is a block diagram illustrating the overview of the unified test workflows by reusing generalized script elements or workflow elements according to one embodiment of the invention.

FIG. 4 is a block diagram illustrating the overview of the unified test workflows by reusing generalized script elements or workflow elements according to one embodiment of the invention. FIG. 4 illustrates, according to one embodiment, the library of generalized scripts can comprise a set of generalized scripts, generalized script 402 and generalized script 404 representing, at least in part, the library of generalized scripts 312. Each of the generalized scripts 202 and 204 represent reusable functionality that can be used by multiple test cases 318 of test suite 316. In another embodiment, generalized scripts 402 and 404 represent generalized scripts that cover different scenarios required for testing specific AUT or a specific functionality/aspect of the AUT. In one embodiment each of the generalized scripts 402 and 404 includes at least one generalized script element out of the set of generalized script element 406, 408, and 410. Generalized script element 410 represents the Nth generalized script element where n is, in one embodiment, a variable representing the last generalized script element in the library of generalized script elements 310. In one embodiment, generalized script elements 406, 408 and 410 produce specific scenario and accept, as input, the data streams from automated test cases. A data stream can be represented by at least of a parameter, configuration file, and/or data file. Thus, in one embodiment, each generalized script element represented in the library of generalized script elements 310 can be used by multiple generalized scripts represented in the library of generalized scripts 312. Further, according to an embodiment, each generalized script represented in library of generalized scripts 312 can be reused by multiple test cases 318 of multiple test suites 316 of test repository 314, where test case 318 are invoked by the automation testing framework using generalized scripts 302.

Figure 5:
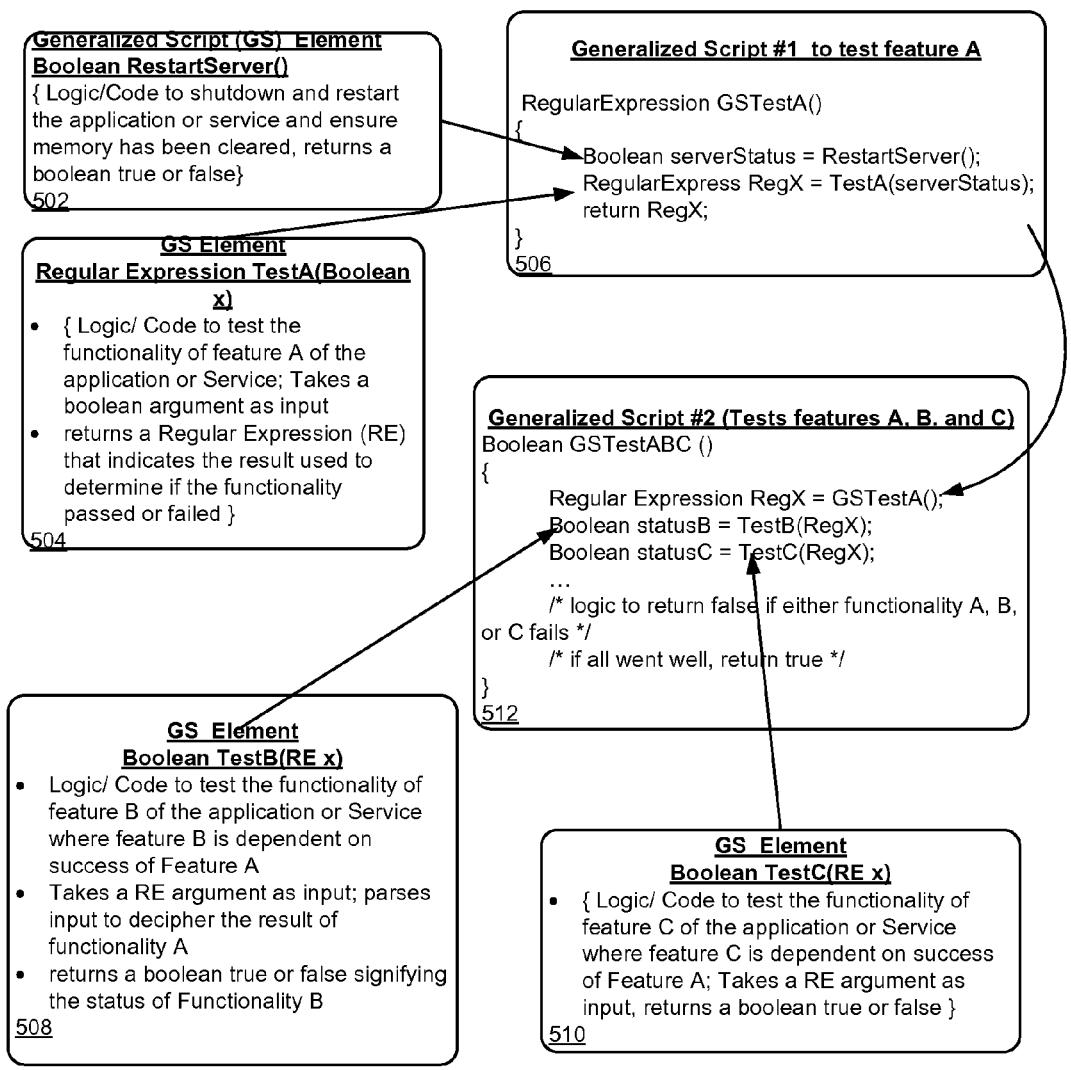
FIGS. 5 and 6 are block diagrams to illustrate a unified test workflow/generalized scripts, in pseudo-code, to develop test cases according to one embodiment of the invention.
Figure 6:
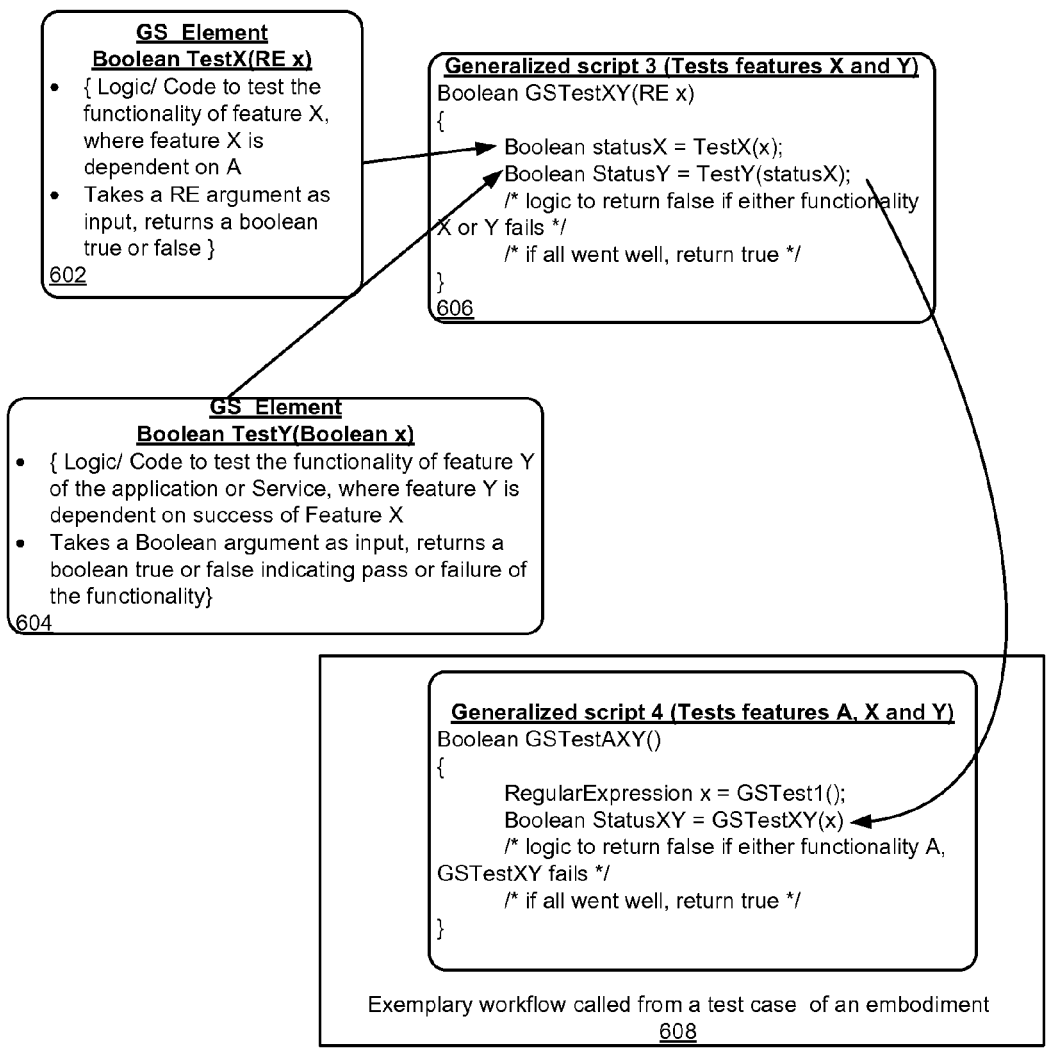

FIGS. 5 and 6 are block diagrams to illustrate an example in pseudo-code to develop unified test workflows according to one embodiment of the invention. As an embodiment of an AUT, FIG. 5 represents the development of a generalized script used to transform, at least in part, traditional test case 202, in accordance to one embodiment of the present invention. Generalized script element 502, Boolean RestartServer( ), represents, in pseudo code, logic/code to shutdown and restart the server represented by the AUT and ensure that memory has been cleared prior to testing a given functionality of the AUT. Generalized script element 502 returns a Boolean value of 'true' if the script is executed successfully and 'false' if the script is unsuccessful. Generalized script element 504, regular expression TestA(Boolean x), represents, in pseudo code, logic/code to test the functionality of feature A of the AUT. Generalized script element 504 accepts a Boolean argument as input and returns a regular expression (RE) that indicates a result used to determine if the functionality of feature A has passed or failed. In one embodiment, generalized script 1 506 is scripted using generalized script elements 502 and 504. In this manner, generalized script 1 506 can be used by multiple test cases 318 represented in multiple test suites 316 if any of the described test cases 318 would like to test the functionality of feature A. In this embodiment, generalized script element 502 is used to reinitialize the server represented by the AUT, prior to beginning of a new test case. Generally, in automated testing a software engineer would like to start afresh before executing a new test case, thus, in one embodiment, it would logically make sense to add server restart code within the generalized script or test workflow. Thus, as represented by generalized script 1 506, regular expression GSTestA( ), in pseudo code, derives such functionality before testing the functionality of feature A. In this embodiment, generalized script 1 506, using generalized script element 502 would restart the server and then test the functionality of feature A using generalized script element 504, returning a regular expression value which would represent a pass or failure of the functionality.

In one embodiment, generalized script 1 506 accepts as input at least one of a parameter, a data file, and/or a configuration file, where the input represents specific information based on which functionality of feature A may be executed differently in each test case (as per the requirements of the test case). As generalized script 1 506 can be used by multiple test cases, each test case, in one embodiment, can have its own specific data streams using which specific functionality of feature A of generalized script 1 506 can be tested. As can be seen by representing a test functionality or aspect of the AUT into a generalized script or workflow, in one embodiment, any updates or maintenance required to test the functionality of feature A of the AUT can be performed by modifying the code/script in either at generalized script 1 506 or at the individual generalized script elements 502 or 504. Generalized script 1 506 can also comprise code/logic which would cause the script to result in a failure in case any of the underlying generalized script elements triggers a failure of their respective functionality.

A generalized script can also be used by other generalized scripts or workflows as represented by generalized script 2 512, according to an embodiment of the present invention. Here, generalized script 2 512 represents a workflow or generalized script that can test functionality A, B, and C. In one embodiment, generalized script 2 512 accepts an input data stream including at least one data file, configuration file, and/or parameter. Generalized script 2 512 includes generalized script 1 506 along with generalized scripts 508 and 510 to result in a generalized script or workflow that tests the functionality of features A, B, and C of an AUT, according to one embodiment of the present invention. In one embodiment, generalized script element 506, Boolean TestB(RE x), as represented in pseudo code can comprise logic/code to test the functionality of feature B of an AUT, where feature B is dependent on success of functionality of feature A. In one embodiment, generalized script element 504 can be used to represent testing functionality of feature A of the AUT. Thus, in this embodiment, generalized script element 508 can accept an input stream based on the testing of A and thus, if generalized script element 508 is used in generalized script 2 512, the functionality encompassing testing functionality a can be derived by reusing generalized script 1 506. Similarly, generalized script element 510, Boolean TestC (RE x), represented in pseudo code, can comprise logic/code to test feature C of the AUT where testing feature C is dependent on success of feature A. Thus, generalized script 2 512 can comprise generalized script 1 506 along with generalized scripts 508 and 510 to result in a generalized script or test workflow that tests the functionality of features A, B, and C of an AUT, according to one embodiment of the present invention. Thus, in one embodiment, test case 202, using the traditional test automation techniques, can be simplified by deriving the functionality of features A, B, and C as described by generalized script 2 512.

FIG. 6 represents the development of a generalized script used to represent, at least in part, traditional test case 204, in accordance to one embodiment of the present invention. In one embodiment, generalized script element 602, Boolean TestX (RE x), represented in pseudo code, describes logic/code to test the functionality of feature X of AUT, where feature X is dependent on successful testing of feature A. In this embodiment, generalized script element 602 accepts a RE argument as input and returns a Boolean value of true or false, indicating success or failure of the testing, respectively. Generalize script element 604, Boolean TestY (Boolean x), represents, in pseudo code, logic/code to test functionality of feature Y of the AUT, where feature Y is dependent on the success of feature X. Generalize script element 604 accepts a Boolean argument as input, and returns a Boolean true or false indicating pass or failure, respectively, of the functionality or feature. In one embodiment, generalize script 3 606, Boolean GSTestXY (RE x), represents, in pseudo code, logic/code to test features X and Y of the AUT, where feature X is dependent on the success of feature A and feature Y is dependent on the success of feature X, as represented by generalize script element 504 and tested in generalize script 1 506. It should be noted, generalize script 1 506 also includes logic/code to restart the service of the AUT to clear memory, etc., so that the test starts afresh. In one embodiment, generalize script 4 608, Boolean GSTestAXY( ), represents in pseudo code a generalized script to test the features A, X, and Y. Here, it can be seen that generalize script 4 608 utilizes generalize script element 602 as well as generalize script 3 606 to derive a generalized script to test features A, X, and Y.

It should be noted any embodiment described above can accept at least one parameter, data file, and/or configuration file as an input data stream, where the data stream provides input to test at least one generalized script according to the business function/requirement of that particular generalized script as used by a particular test case.

FIG. 7 is a block diagram illustrating a test suite in pseudo-code using the test workflows/generalized scripts described in FIGS. 5 and 6. As can be seen, traditional test suite 112 representing traditional test cases 202 and 204 can be simplified using the techniques and method disclosed herein. In one embodiment, test suite 1 702 can test the functionality of features A, B, and C (representing traditional test case 202) with a single call to generalized script 2 512. Similarly, test suite 1 702, in one embodiment, can test the functionality of features A, X, and Y (representing traditional test case 204) with a single call to generalized script 608. In one embodiment, test suite 1 702 includes code to accept at least one of an input parameter, data file, and/or configuration file as part of its initial set up.

As can be seen in FIGS. 5, 6, and 7, with the use of generalize script elements and generalize scripts/test workflows, test cases can reuse the generalized scripts and/or generalized script elements to derive different test cases with a simplified script. As disclosed above, this is advantageous to maintain test suites as a change in a feature or functionality of the AUT can easily be reflected among multiple test cases/test suites by an update/modification of a generalized script/test workflow or generalized script element. The techniques and methods thus disclosed herein assist in transforming time-consuming jobs of scripting, maintaining, and debugging multiple test cases to significantly smaller job of scripting and debugging unified test workflows and workflow elements. The techniques described herein also provide the advantage of significantly reducing the maintenance overhead, especially when the AUT functionality is modified through releases, as redundancy of the code within multiple test case scripts is eliminated by utilizing generalized scripts and generalized script elements.

Figure 8:
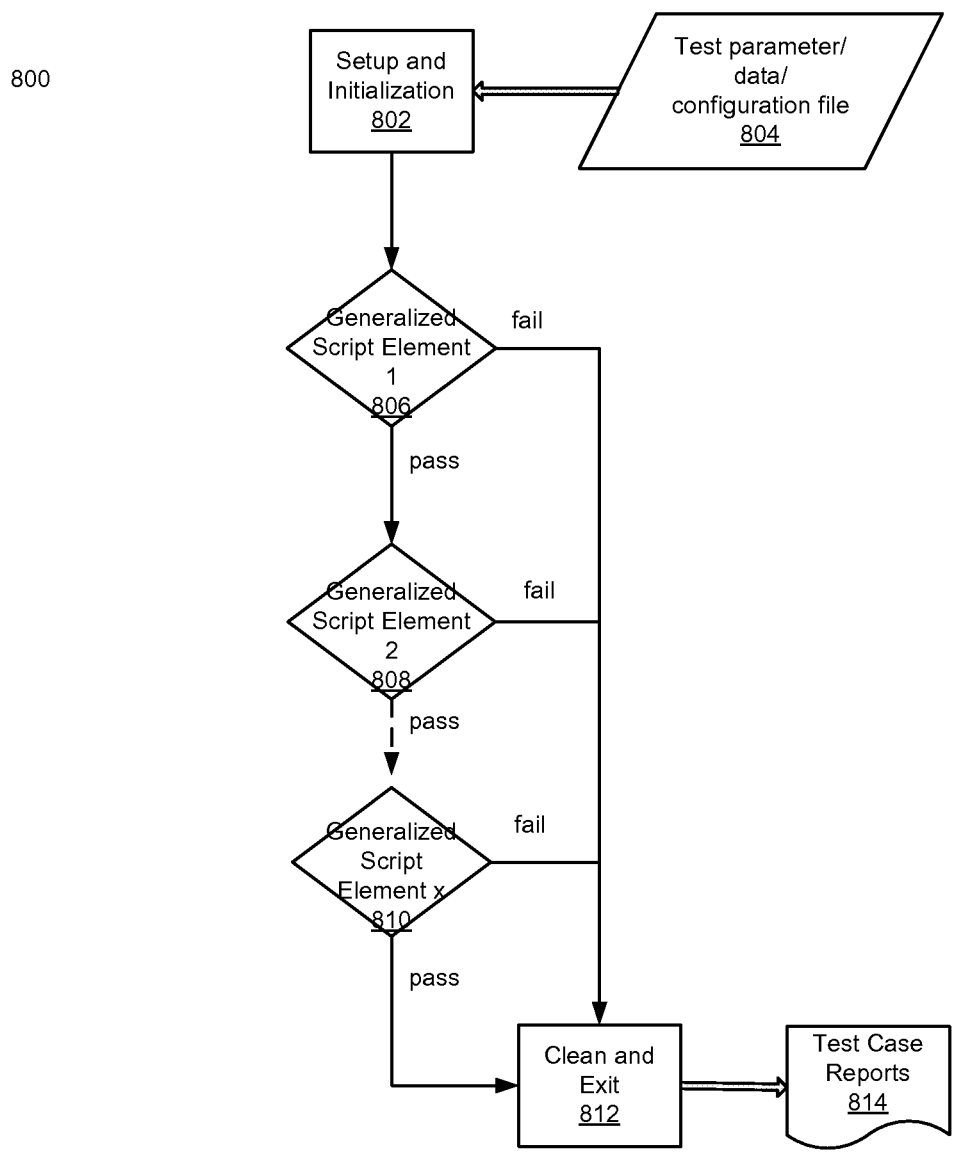
FIG. 8 is a flow chart of a unified workflow/generalized script according to one embodiment of the present invention.

FIG. 8 is a flow chart of a generalized script/a test case representing a unified workflow/generalized script 800 according to one embodiment of the present invention. In one embodiment, generalized script 800 includes logic/code for setting up and initializing the generalized script for a given test case, as represented by block 802. Block 802 accepts at least one test parameter, data file and/or a configuration file as represented by block 804 used to invoke at least one generalized script. At decision block 806 a generalized script element is executed. If generalized script element 806 passes the test of its respective functionality, then the execution proceeds to the next generalized script as represented by block 808. Similarly, execution proceeds to the subsequent generalized element as represented by decision block 810 after a successful execution of generalized script 808. However, at any stage of execution if a failure results, then the generalized script exits as represented by block 812. After successful execution of all generalized script elements or failure of any functionality of the unified workflow, the generalized script exits the execution and saves the test reports as represented by block 812 and 814 respectively. In one embodiment the test reports are saved in a log file. In another embodiment, the test case reports are displayed on the screen. In another embodiment, the test case reports are saved in a graphical format.

Figure 9:
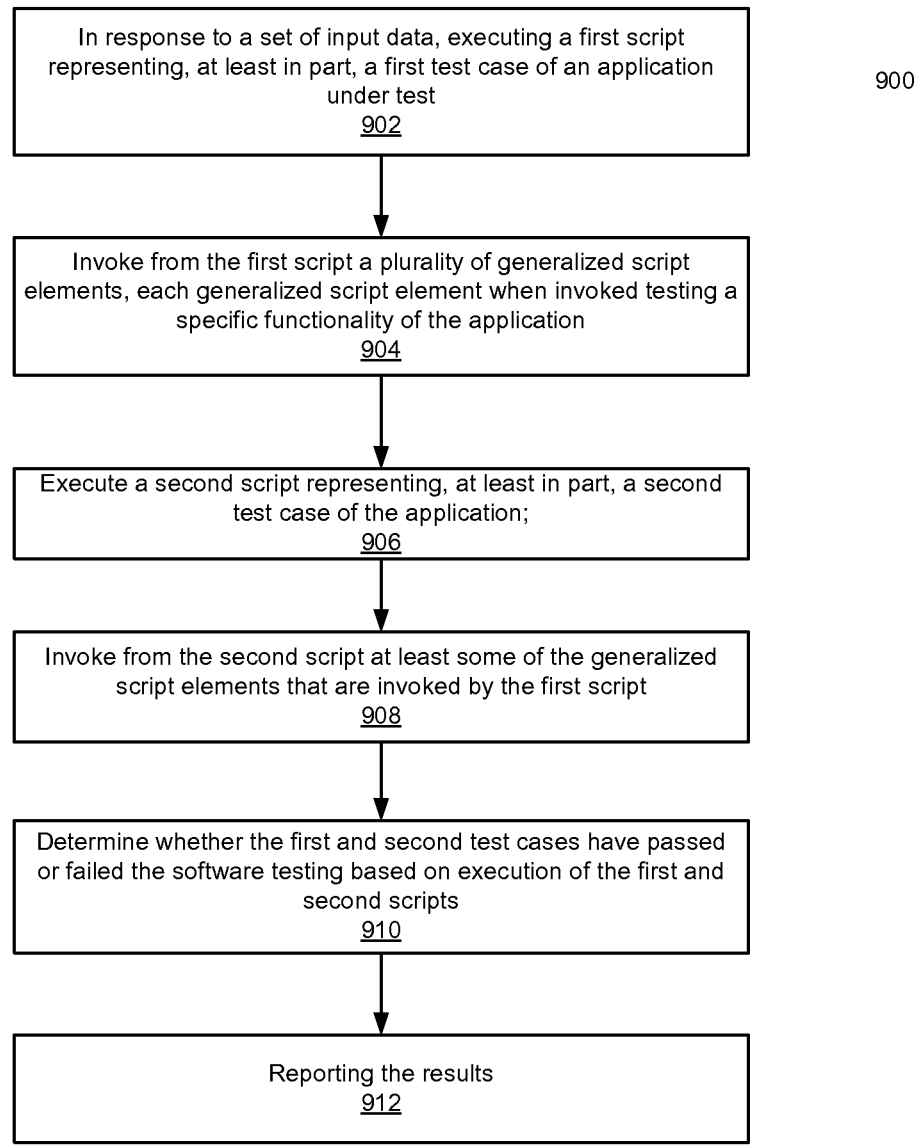
FIG. 9 is a flow diagram illustrating a process of testing an application according to one embodiment of the invention.

FIG. 9 is a flow diagram illustrating an embodiment of a unified workflow approach, according to one embodiment of the invention. Method 900 can be performed by processing logic which may include software, hardware, or a combination there of. For example, method 900 may be performed by framework 102 of FIG. 3.

Referring to FIG. 9, at block 902, in response to a set of input data the processing logic executes a first script representing, at least in part, a first test case of the AUT. In one embodiment, the set of input data is at least one of a configuration file, a data file, and/or a parameter. In one embodiment the configuration file represents at least one global environment variable used to execute the generalized script element. In one embodiment, a generalized script element includes a general library of functions, the general library of functions providing functions or procedures required to process the AUT. At block 904, a first script, representing at least in part a first test case, invokes at least one generalized script element, where the generalized script element when invoked tests a specific functionality of the AUT. At block 906, a second script representing, at least in part, a second test case of the AUT is executed. At block 908, the second script invokes at least some of the generalized script elements invoked by the first test script. At block 910 it is determined whether the first and second test cases have passed or failed the software testing based on execution of the first and second scripts. At block 912 the results to the test automation of the AUT as represented by the first and second scripts are reported.

Figure 10:
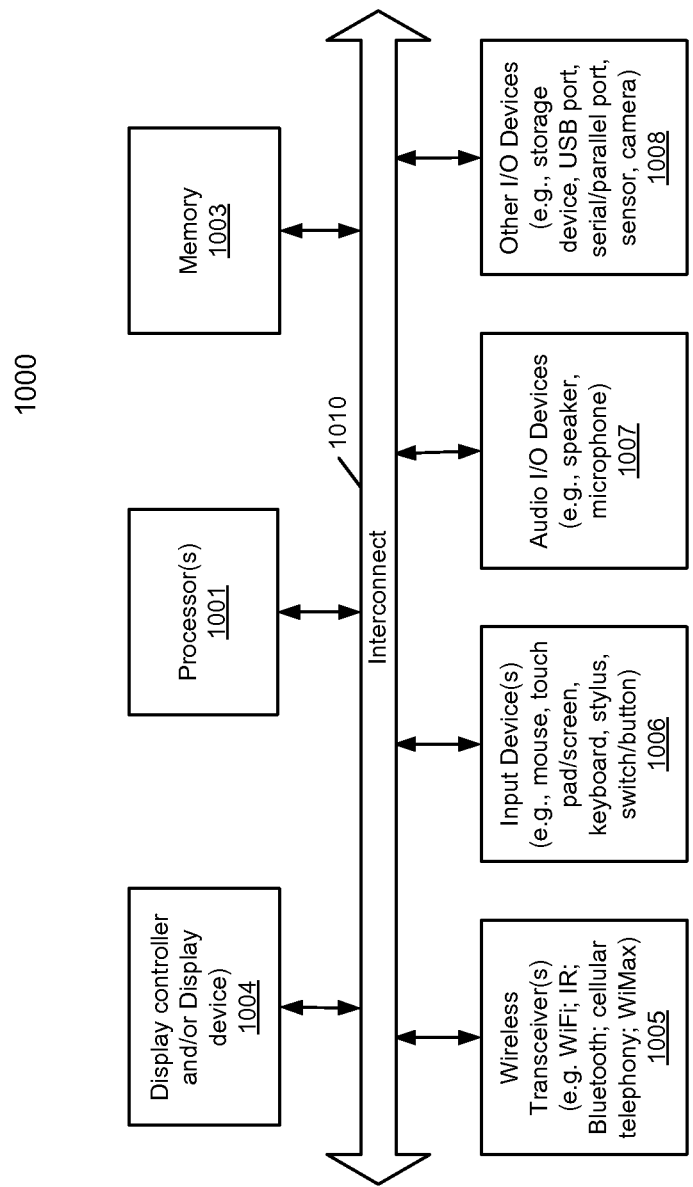
FIG. 10 is a block diagram illustrating a computing system which may be used with one embodiment of the invention.

FIG. 10 is a block diagram illustrating a system 1000 which may be used with one embodiment of the invention.

For example, system 1000 may be implemented as part of a system implementing the automated testing framework according to one embodiment of the present invention. In one embodiment, system 1000 may represent a testing server used for automated testing of an AUT. System 1000 may have a distributed architecture, or all of its components may be integrated into a single unit. Computing system 1000 may be implemented as part test automation of diverse AUTs used by the NetWorker™ products available from EMC® Corporation of Hopkinton, Mass.

For example, system 1000 may represents any of data processing systems described above performing any of the processes or methods described above. System 1000 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1000 is intended to show a high level view of many components of the computer system. However, it is to be understood that additional components may be present in certain implementations and furthermore, different arrangement of the components shown may occur in other implementations. System 1000 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

In one embodiment, system 1000 includes processor 1001, memory 1003, and devices 1005-1008 via a bus or an interconnect 1010. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1001, which may be a low power multi-core processor socket such as an ultra low voltage processor, may act as a main processing unit and central hub for communication with the various components of the system. Such processor can be implemented as a system on chip (SoC). In one embodiment, processor 1001 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments. Processor 1001 is configured to execute instructions for performing the operations and steps discussed herein. System 1000 further includes a graphics interface that communicates with graphics subsystem 1004, which may include a display controller and/or a display device.

Processor 1001 may communicate with memory 1003, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 2010-2E (published April 2010), or a next generation LPDDR standard to be referred to as LPDDR3 that will offer extensions to LPDDR2 to increase bandwidth. As examples, 2/4/8 gigabytes (GB) of system memory may be present and can be coupled to processor 810 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1000 may further include IO devices such as devices 1005-1008, including wireless transceiver(s) 1005, input device(s) 1006, audio IO device(s) 1007, and other IO devices 1008. Wireless transceiver 1005 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 1007 may include a speaker and/or a microphone to facilitate voice-enabled functions, such as voice recognition, voice replication, digital recording, and/or telephony functions. Other optional devices 1008 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1008 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1001, e.g., via a serial peripheral interface (SPI). This flash device may provide for non-volatile storage of system software, including a basic input/output software (BIOS) as well as other firmware of the system.

Note that while system 1000 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

According to some embodiments, the testing techniques described above can be utilized to test backup software that is configured to back up data from a source storage to a target storage. The source and target storage systems may be deduplicated storage systems in which a deduplication engine is configured to deduplicate data chunks of files before storing the deduplicated data chunks in a storage device, such that no duplicated data chunk is stored in the storage system.

Figure 11:
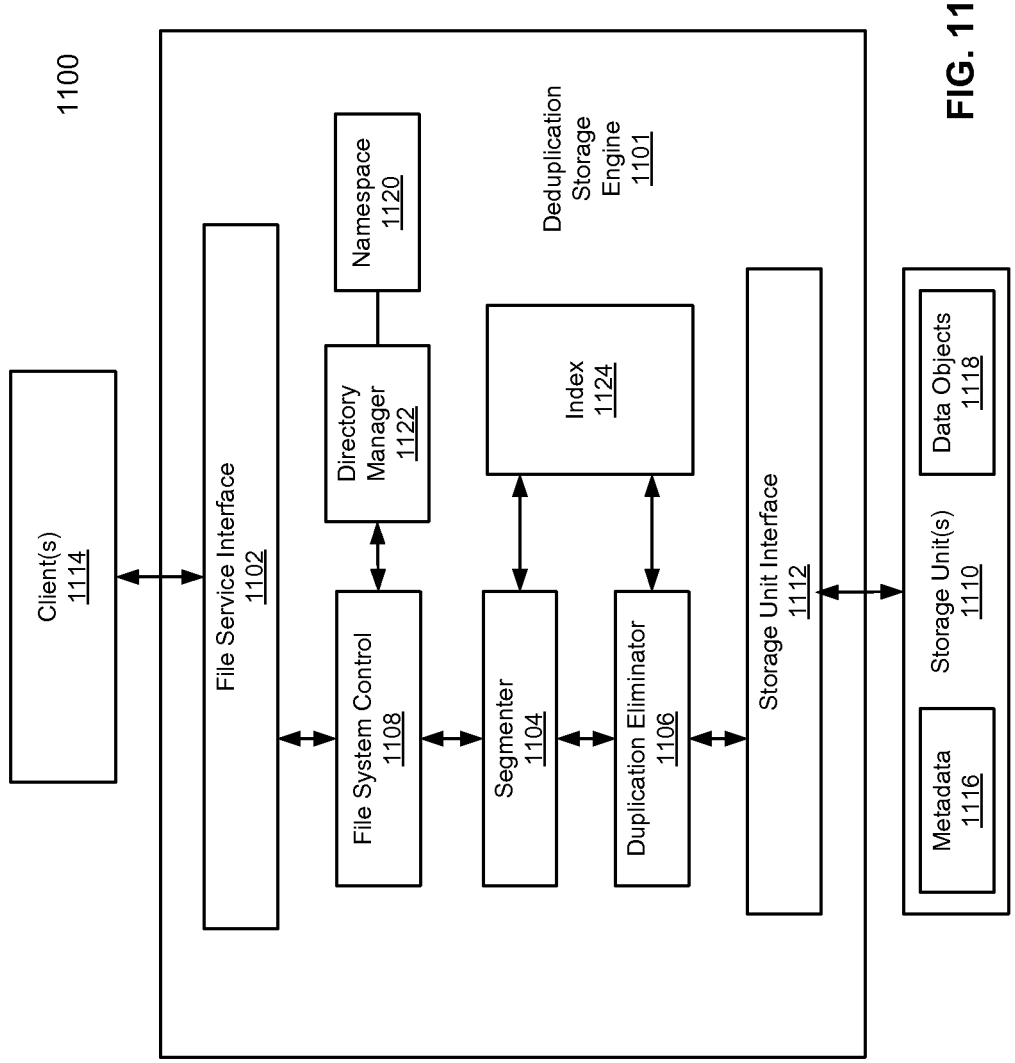
FIG. 11 is a block diagram illustrating a deduplication storage system (as an AUT) according to one embodiment of the invention.

FIG. 11 is a block diagram illustrating a deduplication storage system (as an AUT) according to one embodiment of the invention. For example, deduplication storage system 1100 may be implemented as part of a deduplication storage system as described above, such as, for example, the deduplication storage system as a client and/or a server. In one embodiment, storage system 1100 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1100 may have a distributed architecture, or all of its components may be integrated into a single unit. Storage system 1100 may be implemented as part of an archive and/or backup system such as a deduplicating storage system available from EMC® Corporation of Hopkinton, Mass.

In one embodiment, storage system 1100 includes a deduplication engine 1101 interfacing one or more clients 1114 with one or more storage units 1110 storing metadata 1116 and data objects 1118. Clients 1114 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1110 may be implemented locally (e.g., single node operating environment) or remotely (e.g., multi-node operating environment) via an interconnect, which may be a bus and/or a network (e.g., a storage network). In one embodiment, one of storage units 1110 operates as an active storage to receive and store external or fresh user data from a client (e.g., an end-user client or a primary storage system associated with one or more end-user clients), while the another one of storage units 1110 operates as a target storage unit to periodically archive data from the active storage unit according to an archiving policy or scheme. Storage units 1110 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1110 may also be combinations of such devices. In the case of disk storage media, the storage units 1110 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1116, may be stored in at least some of storage units 1110, such that files can be accessed independent of another storage unit. Metadata of each storage unit includes enough information to provide access to the files it contains. In one embodiment, metadata may include fingerprints contained within data objects 1118, where a data object may represent a data chunk, a compression region (CR) of one or more data chunks, or a container of one or more CRs. Fingerprints are mapped to a particular data object via metadata 1116, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1116 may include a file name, a storage unit identifier (ID) identifying a storage unit in which the chunks associated with the file name are stored, reconstruction information for the file using the chunks, and any other appropriate metadata information. Metadata 1116 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1101 includes file service interface 1102, segmenter 1104, duplicate eliminator 1106, file system control 1108, and storage unit interface 1112. Deduplication storage engine 1101 receives a file or files (or data item(s)) via file service interface 1102, which may be part of a file system namespace 1120 of a file system associated with the deduplication storage engine 1101. The file system namespace 1120 refers to the way files are identified and organized in the system. An example is to organize the files hierarchically into directories or folders, which may be managed by directory manager 1122. File service interface 1112 supports a variety of protocols, including a network file system (NFS), a common Internet file system (CIFS), and a virtual tape library interface (VTL), etc.

The file(s) is/are processed by segmenter 1104 and file system control 1108. Segmenter 1104, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system control 1108, also referred to as a file system manager, processes information to indicate the chunk(s) association with a file. In some embodiments, a list of fingerprints is used to indicate chunk(s) associated with a file. File system control 1108 passes chunk association information (e.g., representative data such as a fingerprint) to index 1124. Index 1124 is used to locate stored chunks in storage units 1110 via storage unit interface 1112. Duplicate eliminator 1106, also referred to as a segment store, identifies whether a newly received chunk has already been stored in storage units 1110. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1110 that make up the file. Chunks are then packed by a container manager (which may be implemented as part of storage unit interface 1112) into one or more storage containers stored in storage units 1110. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1102 is configured to communicate with file system control 1108 to identify appropriate chunks stored in storage units 1110 via storage unit interface 1112. Storage unit interface 1112 may be implemented as part of a container manager. File system control 1108 communicates (e.g., via segmenter 1104) with index 1124 to locate appropriate chunks stored in storage units via storage unit interface 1112. Appropriate chunks are retrieved from the associated containers via the container manager and are used to construct the requested file. The file is provided via interface 1102 in response to the request. In one embodiment, file system control 1108 utilizes a tree (e.g., a chunk tree obtained from namespace 1120) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1101 may be implemented in software (e.g., executable code executed in a memory by a processor), hardware (e.g., processor(s)), or a combination thereof. For example, deduplication engine 1101 may be implemented in a form of executable instructions that can be stored in a machine-readable storage medium, where the instructions can be executed in a memory by a processor.

In one embodiment, storage system 1100 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of software testing, the method comprising:
   in response to a set of input data, executing, by a computer hardware processor, a first script representing a first test case of an application under test, wherein the first test case includes a first test configuration file, a first test parameter, and a first test data file;
   invoking from the first script a plurality of generalized script elements, each generalized script element when invoked testing a specific functionality of the application under test;
   executing, by the computer hardware processor, a second script representing a second test case of the application under test, wherein the second test case includes a second test configuration file, a second test parameter, and a second test data file;
   invoking from the second script at least some of the plurality of generalized script elements that are invoked by the first, wherein the first script, the second script, and the generalized script elements are distinct, and wherein the at least some of the generalized script elements are used to test one or more common functionalities that are common to the first test case and the second test case; and determining whether the first and second test cases have passed or failed the software testing based on execution of the first and second scripts, wherein the first script and the second script are utilized to test functionalities of a storage application of a first storage system that backs up data from a second storage system over a network, wherein data stored in the first storage system is deduplicated into deduplicated segments, wherein the deduplicated segments are compressed into one or more compression regions (CRs) using a compression algorithm comprising a Lempel-Ziv algorithm, and wherein the CRs of the compressed deduplicated segments are then stored in a persistent storage device of the first storage system.

2. The method of claim 1, wherein the plurality of generalized script elements comprises a general library of functions, the general library of functions providing functions or procedures required to process the application under test.

3. The method of claim 1, wherein at least one of the first script or the second script represents a generalized script, the generalized script used by a plurality of test suits, wherein each test suite represents a set of one or more test cases.

4. The method of claim 1, wherein the second script is invoked in response to another set of input data.

5. The method of claim 1, wherein the set of input data comprises at least one of a configuration file, a parameter, or a data file.

6. The method of claim 5, wherein the configuration file provides environment variables pertaining to the application under test.

7. A non-transitory computer readable medium comprising instructions which when executed by a processing system perform operations, the operations comprising:

in response to a set of input data, executing, by a computer hardware processor, a first script representing a first test case of an application under test, wherein the first test case includes a first test configuration file, a first test parameter, and a first test data file;

invoking from the first script a plurality of generalized script elements, each generalized script element when invoked testing a specific functionality of the application under test;

executing, by the computer hardware processor, a second script representing a second test case of the application under test, wherein the second test case includes a second test configuration file, a second test parameter, and a second test data file;

invoking from the second script at least some of the plurality of generalized script elements that are invoked by the first script, wherein the first script, the second script, and the generalized script elements are distinct, and herein the at least some of the generalized script elements are used to test one or more common functionalities that are common to the first test case and the second test case; and determining whether the first and second test cases have passed or failed the software testing based on execution of the first and second scripts, wherein the first script and the second script are utilized to test functionalities of a storage application of a first storage system that backs up data from a second storage system over a network, wherein data stored in the first storage system is deduplicated into deduplicated segments, wherein the deduplicated segments are compressed into one or more compression regions (CRs) using a compression algorithm comprising a Lempel-Ziv algorithm, and wherein the CRs of the compressed deduplicated segments are then stored in a persistent storage device of the first storage system.

8. The non-transitory computer readable medium of claim 7, wherein the plurality of generalized script elements comprises a general library of functions, the general library of functions providing functions or procedures required to process the application under test.

9. The non-transitory computer readable medium of claim 7, wherein at least one of the first script or the second script represents a generalized script, the generalized script used by a plurality of test suits, wherein each test suite represents a set of one or more test cases.

10. The non-transitory computer readable medium of claim 7, wherein the second script is invoked in response to another set of input data.

11. The non-transitory computer readable medium of claim 7, wherein the set of input data comprises at least one of a configuration file, a parameter, or a data file.

12. The non-transitory computer readable medium of claim 11, wherein the configuration file provides environment variables pertaining to the application under test.

13. A data processing system comprising:
a computer hardware processor; and
a memory coupled to the computer hardware processor storing instructions, which when executed from the memory, cause the computer hardware processor to:

in response to a set of input data, execute a first script representing a first test case of an application under test, wherein the first test case includes a first test configuration file, a first test parameter, and a first test data file, invoke from the first script a plurality of generalized script elements, each generalized script element when invoked testing a specific functionality of the application under test, execute a second script representing a second test case of the application under test, wherein the second test case includes a second test configuration file, a second test parameter, and a second test data file, invoke from the second script at least some of the plurality of generalized script elements that are invoked by the first script, wherein the first script, the second script, and the generalized script elements are distinct, and herein the at least some of the generalized script elements are used to test one or more common functionalities that are common to the first test case and the second test case; and determine whether the first and second test cases have passed or failed the software testing based on execution of the first and second scripts, wherein the first script and the second script are utilized to test functionalities of a storage application of a first storage system that backs up data from a second storage system over a network, wherein data stored in the first storage system is deduplicated into deduplicated segments, wherein the deduplicated segments are compressed into one or more compression regions (CRs) using a compression algorithm comprising a Lempel-Ziv algorithm, and wherein the CRs of the compressed deduplicated segments are then stored in a persistent storage device of the first storage system.

14. The system of claim 13, wherein the plurality of generalized script elements comprises a general library of functions, the general library of functions providing functions or procedures required to process the application under test.

15. The system of claim 13, wherein at least one of the first script or the second script represents a generalized script, the generalized script used by a plurality of test suits, wherein each test suite represents a set of one or more test cases.

16. The system of claim 13, wherein the second script is invoked in response to another set of input data.

17. The system of claim 13, wherein the set of input data comprises at least one of a configuration file, a parameter, or a data file.

18. The system of claim 17, wherein the configuration file provides environment variables pertaining to the application under test.

19. The method of claim 1, wherein the first test script and the second test script are utilized to test functionalities of a storage application of a storage system that backs up data from a plurality of data processing systems.

20. The non-transitory computer readable medium of claim 7, wherein the first test script and the second test script are utilized to test functionalities of a storage application of a storage system that backs up data from a plurality of data processing systems.

21. The system of claim 13, wherein the first test script and the second test script are utilized to test functionalities of a storage application of a storage system that backs up data from a plurality of data processing systems.

\* \* \* \* \*